United States Patent
Blondin et al.

(10) Patent No.: US 10,422,454 B2
(45) Date of Patent: Sep. 24, 2019

(54) COUPLING WITH INTEGRAL FLUID PENETRATION BARRIER

(71) Applicants: Sean Michael Blondin, East Granby, CT (US); John Brian Schneider, West Springfield, MA (US); Paul John Gongola, Enfield, CT (US)

(72) Inventors: Sean Michael Blondin, East Granby, CT (US); John Brian Schneider, West Springfield, MA (US); Paul John Gongola, Enfield, CT (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1095 days.

(21) Appl. No.: 14/320,010

(22) Filed: Jun. 30, 2014

(65) Prior Publication Data

US 2015/0377474 A1    Dec. 31, 2015

(51) Int. Cl.
*F16L 21/08* (2006.01)
*F21V 31/00* (2006.01)
(Continued)

(52) U.S. Cl.
CPC .............. *F16L 21/08* (2013.01); *F21V 21/06* (2013.01); *F21V 31/00* (2013.01); *F21W 2111/06* (2013.01)

(58) Field of Classification Search
CPC ......... F16L 21/08; F16L 37/56; F16L 37/565; F16B 31/021; F21V 21/06
(Continued)

(56) References Cited

U.S. PATENT DOCUMENTS 791,905 A * 6/1905 Higginbotham ...... F16L 33/224
                                                   285/136.1
2,267,533 A * 12/1941 O'Brien .................... E03B 9/02
                                                      285/112
(Continued)

FOREIGN PATENT DOCUMENTS

EP          2563668         4/2014
FR          2958459 A1 * 10/2011    ............... H01R 4/36
(Continued)

OTHER PUBLICATIONS

Lukashina, E., International Search Report and Written Opinion of the International Searching Authority for PCT/US2015/038262, completed Sep. 4, 2015, dated Oct. 29, 2015 pp. 1-7.
(Continued)

*Primary Examiner* — Anna M Momper
*Assistant Examiner* — Fannie C Kee
(74) *Attorney, Agent, or Firm* — King & Spalding LLP

(57) ABSTRACT

A support coupling which provides a frangible point for a lighting fixture, and which prevents water from accumulating at the frangible point and from penetrating an inner chamber of the lighting fixture where electronic components are disposed includes an inner wall and an outer wall. The inner wall has a higher grade (i.e., is taller) than the outer wall. A space between the inner wall and the outer wall receives an extension column. Water running down the sides of the extension column is collected in the space and pours out of the coupling over the shorter outer wall before the water reaches the top of the inner wall.

15 Claims, 2 Drawing Sheets

(51) Int. Cl.
*F21V 21/06* (2006.01)
*F21W 111/06* (2006.01)

(58) Field of Classification Search
USPC .............. 285/3–4, 90, 331, 404; 411/2, 3, 5;
256/65.14
See application file for complete search history.

(56) References Cited

U.S. PATENT DOCUMENTS

| | | | |
|---|---|---|---|
| 2,467,520 A * | 4/1949 | Brubaker | F16L 33/224 |
| | | | 285/249 |
| 2,561,827 A * | 7/1951 | Soos | F16L 33/224 |
| | | | 285/248 |
| 2,655,591 A | 10/1953 | Clark | |
| 3,194,956 A | 7/1965 | Troccoli | |
| 4,194,768 A * | 3/1980 | Gretz | F16L 37/113 |
| | | | 285/148.27 |
| 4,225,162 A * | 9/1980 | Dola | F16L 25/01 |
| | | | 174/665 |
| 4,499,527 A | 2/1985 | Tauber et al. | |
| 4,679,827 A * | 7/1987 | Law | H02G 3/0616 |
| | | | 285/151.1 |
| 5,051,541 A * | 9/1991 | Bawa | F16L 33/223 |
| | | | 174/655 |
| 5,072,072 A * | 12/1991 | Bawa | H02G 3/0691 |
| | | | 174/655 |
| 5,144,540 A | 9/1992 | Hayes | |
| 5,176,409 A * | 1/1993 | Brooks | F16L 17/08 |
| | | | 285/334.4 |
| 5,950,985 A * | 9/1999 | Petterson | F16L 27/04 |
| | | | 251/149.1 |
| 6,042,251 A | 3/2000 | McCarthy et al. | |
| 6,450,670 B1 | 9/2002 | Strauss et al. | |
| 6,533,446 B2 | 3/2003 | Chen et al. | |
| 7,033,038 B2 | 4/2006 | Hagen | |
| 7,083,315 B2 | 8/2006 | Hansler et al. | |
| 7,192,155 B2 | 3/2007 | Morrow et al. | |
| 7,997,765 B2 | 8/2011 | Johnson | |
| 8,167,646 B1 * | 5/2012 | Mathews | H01R 9/05 |
| | | | 439/578 |
| 8,511,858 B2 | 8/2013 | Morrow | |
| 8,632,230 B2 | 1/2014 | Olsson et al. | |
| 2001/0014021 A1 | 8/2001 | Duff et al. | |
| 2002/0196633 A1 | 12/2002 | Huang | |
| 2007/0121329 A1 | 5/2007 | Morrow et al. | |
| 2009/0296379 A1 | 12/2009 | Tartock et al. | |
| 2011/0318953 A1* | 12/2011 | Battle | H01R 4/2408 |
| | | | 439/359 |
| 2013/0094192 A1 | 4/2013 | De Boeck et al. | |

FOREIGN PATENT DOCUMENTS

RU 2115859 7/1998
RU 46073 6/2005

OTHER PUBLICATIONS

Translation of RU 2115859 C1 generated from Lexis Nexis Total Patents, 2 pages, Jan. 20, 2016.
Translation of RU 246073 U1 generated from Lexis Nexis Total Patents, 2 pages, Jan. 20, 2016.
Dinkla, Remco, Extended European Search Report issued in EP application No. 15814089.7, completion date Dec. 8, 2017, 9 pages.

* cited by examiner

COUPLING WITH INTEGRAL FLUID PENETRATION BARRIER

TECHNICAL FIELD

The present disclosure relates generally to a coupling for an elevated lighting fixture. Specifically, the present disclosure relates to a coupling which has an integrated fluid penetration barrier to prevent accumulation of water within the lighting fixture.

BACKGROUND

Elevated lighting fixtures for airfield applications are required by the Federal Aviation Administration (FAA) to be constructed so that a tight seal is formed between components. This is to prevent water from accumulating inside the light fixture and potentially damaging the internal electronics. It is required that a gasket be used between a fixture cover and the body in order to improve the seal. Furthermore, elevated lighting fixtures are also required to have a frangible point. A frangible coupling is a type of coupling, such as that used to couple an elevated lighting fixture to a light base on or under the ground, which is designed to break cleanly at the frangible point when certain force is applied to the fixture, such as under high wind conditions. This allows the fixture to break in a preferred and controlled manner rather than breaking into many pieces. It is further necessary that elevated lighting fixtures be constructed such that any water accumulated internally, such as due to condensation, leakage, etc., be drained away from the frangible point rather than accumulate at the frangible point. A drain hole, such as a weep hole is often used in products and structures to provide a drainage means for internally accumulated water. Current elevated light fixtures require either some type of an additional seal formed between components, such as a silicone rubber seal, or a drainage hole, in order to prevent water accumulation and/or water from entering the fixture. However, certain airport lighting specifications dictate that such weep holes should not be put into fixture couplings. Thus, an alternative technique for preventing water accumulation and providing drainage is needed in order to meet FAA requirements for elevated lighting fixtures and couplings.

SUMMARY

According to one aspect of the present disclosure, a support coupling comprises a body which comprises a top portion, a bottom portion, and a frangible portion. The top portion comprises an inner cylindrical wall and an outer cylindrical wall disposed around the inner cylindrical wall. Each of the inner cylindrical wall and the outer cylindrical wall comprises a top edge and a bottom edge. The top portion further includes a base extending from the bottom edge of the inner cylindrical wall to the bottom edge of the outer cylindrical wall. A space is formed between the inner cylindrical wall, the outer cylindrical wall, and the base, and the top end of the inner cylindrical wall extends beyond the top end of the outer cylindrical wall. The bottom portion comprises a coupling feature, and the frangible portion is disposed between the top portion and the bottom portion. An inner opening traverses the top portion, the bottom portion and the frangible portion.

According to another aspect of the present disclosure, a coupling includes an inner cylindrical wall and an outer cylindrical wall surrounding the inner cylindrical wall, in which the inner cylindrical wall is coupled to the outer cylindrical wall via a base. Each of the inner cylindrical wall and the outer cylindrical wall comprises an inner diameter and an outer diameter, in which the inner diameter of the outer cylindrical wall is larger than the outer diameter of the inner cylindrical wall such that a space exists between the inner cylindrical wall and the outer cylindrical wall. Furthermore, the inner cylindrical wall is at a higher grade than the outer cylindrical wall. The coupling also includes a bottom portion disposed below the base, the bottom portion coupled to the base via a frangible portion, the frangible portion being a structural weak point on the coupling.

According to yet another aspect of the present disclosure, a coupling includes an inner wall and an outer wall disposed around the inner wall with a clearance therebetween. The inner wall and the outer wall each comprise a top edge and a bottom edge. The bottom edge of the inner wall and the bottom edge of the outer wall are coupled via a base, and the top edge of the inner wall extends beyond the top edge of the outer wall. The coupling further includes a bottom coupler extending below the base configured to mount the coupling onto a receiving structure.

BRIEF DESCRIPTION OF THE DRAWINGS

For a more complete understanding of the disclosure and the advantages thereof, reference is now made to the following description, in conjunction with the accompanying figures briefly described as follows.

Figure 1:
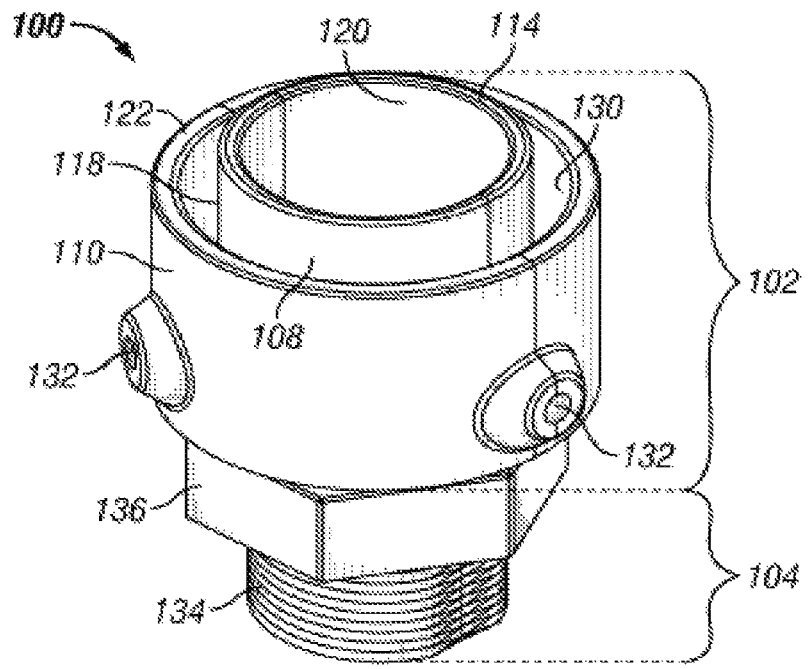
FIG. 1 illustrates perspective view of a coupling with a fluid penetration barrier, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The present disclosure provides coupling which provides a fluid penetration barrier which helps prevents fluids from entering an internal opening of the coupling, which help protect electronic components from damage caused by the accumulation of fluids. The present disclosure illustrates the coupling as used in a lighting system for example purposes. However, the coupling disclosure herein can be used, serving a similar purpose, in other types of elevated fixtures, such as signs, posts, other elevated electronic devices, and the like.

As described above, a solution is needed to prevent water from accumulating within a lighting fixture and particularly around a frangible point in an elevated lighting fixture. Current solutions do not do this efficiently or do not abide by all requirements and specifications for airfield lighting. The present disclosure provides a support coupling which provides a frangible point for the fixture, and which prevents water from accumulating at the frangible point and from penetrating an inner chamber of the lighting fixture where electronic components are disposed. In certain example embodiments, the coupling accomplishes this by providing an inner wall and an outer wall, in which the inner wall has a higher grade (i.e., is taller) than the outer wall. A space between the inner wall and the outer wall can receive an extension column. Water running down the sides of the extension column is collected in the space and pours out of the coupling over the shorter outer wall before the water reaches the inner wall. Thus, under normal conditions, the water will not pour over the top of the inner wall and into the inner chamber. Furthermore, the space is provided away from the frangible point such that the water never accumulates around the frangible point.

Figure 2:
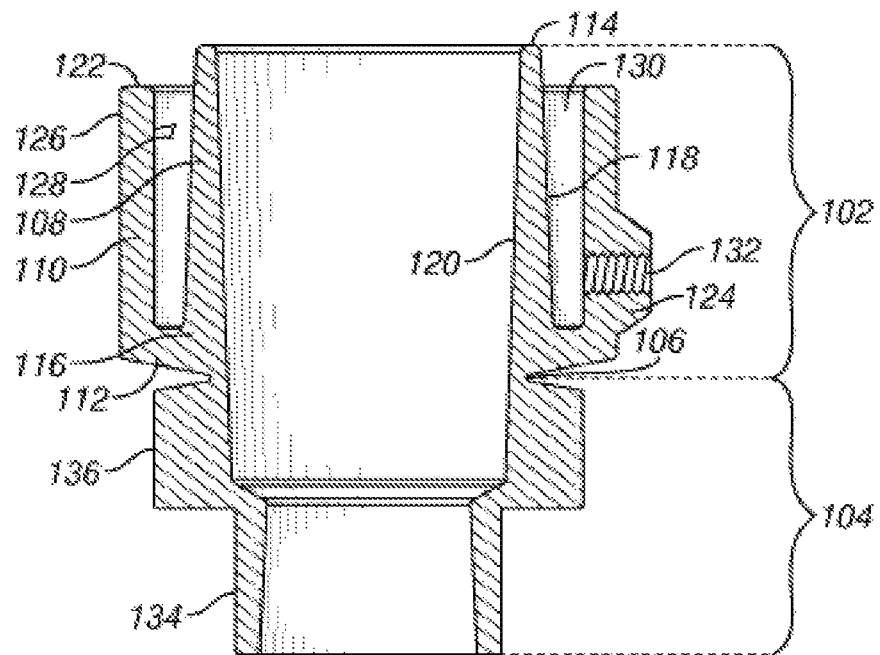
FIG. 2 illustrates a cross-sectional view of the coupling with a fluid penetration barrier, in accordance with example embodiments of the present disclosure.

Turning to the drawings, FIG. 1 illustrates a perspective view of a coupling with fluid penetration barrier 100 (hereinafter "coupling 100"), in accordance with example embodiments of the present disclosure. FIG. 2 illustrates a cross-sectional view of the coupling 100 of FIG. 1. Referring to FIGS. 1 and 2, in certain example embodiments, the coupling 100 includes an integral body made up of a top portion 102, a bottom portion 104, and a frangible portion 106. In certain example embodiments, the top portion 102 includes an inner cylindrical wall 108, an outer cylindrical wall 110, and a base 112. In certain example embodiments, the inner cylindrical wall 108 has a tubular shape and is defined between a top edge 114, a bottom edge 116, an outer surface 118 having an outer diameter, and an inner surface 120 having an inner diameter. Likewise, in certain example embodiments, the outer cylindrical wall 110 has a tubular shape and is defined between a top edge 122, a bottom edge 124, an outer surface 126 having an outer diameter, and an inner surface 128 having an inner diameter. In certain example embodiments, the outer cylindrical wall 110 is disposed around at least a portion of the inner cylindrical wall 108 and the outer diameter of the inner cylindrical wall is smaller than the inner diameter of the outer cylindrical wall.

In certain example embodiments, there is a space 130 or clearance between the outer surface 118 of the inner cylindrical wall and the inner surface 128 of the outer cylindrical wall 110. In certain example embodiments, the inner cylindrical wall and the outer cylindrical wall are concentric. In certain example embodiments, the base 112 is coupled to the bottom edge 116 of the inner cylindrical wall 108 and the bottom edge 124 of the outer cylindrical wall 110 such that the inner cylindrical wall 108 and the outer cylindrical wall 110 are connected via the base 112. In certain example embodiments, the base 112 is a solid surface. In certain example embodiments, the space 130 between the inner cylindrical wall 108 and the outer cylindrical wall 110 is further bound by the base 112. In certain example embodiments, the space 130 constitutes a channel. In certain example embodiments, the space 130 is configured to collect drained water and isolate the water from the inside of the inner cylindrical wall 108.

In certain example embodiments, the top edge 114 of the inner cylindrical wall 108 is at a higher grade than the top edge 122 of the outer cylindrical wall 110 such that the inner cylindrical wall 108 extends beyond the outer cylindrical wall 110. In certain example embodiments, the inner cylindrical wall 108 is taller than the outer cylindrical wall 110. Thus, when water is collected in the space 130 and as the water level rises, the water will flow over the top edge 122 of the outer cylindrical wall 110 and out of the coupling 100. The top edge 114 of the inner cylindrical wall 108 being at a higher grade than the outer cylindrical wall 110 helps prevent water from rising up to the top edge 114 of the inner cylindrical wall 108 and entering the inside of the inner cylindrical wall 108 and the fixture. In certain example embodiments, the outer surface 118 of the inner cylindrical wall 108 is tapered, in which the outer diameter of the inner cylindrical wall 108 increases in magnitude from the top edge 114 to the bottom edge 116. In certain example embodiments, the outer cylindrical wall 110 includes one or more securing features such as but not limited to a screw hole 132 for a securing element when coupling to a lighting device or extension column. Although the example embodiments illustrated herein feature a substantially cylindrical body with cylindrical inner and outer walls, other example embodiments can have other shapes when viewed from a top view of the top portion 102 of the coupling 100. The other shapes may include polygonal shapes such as a square or rectangle, elliptical or circular shapes, partially polygonal and partially circular shapes. Additionally, the cross-sectional shape of the inner wall and the outer wall of the coupling need not be the same. For example, the inner wall can have a circular cross-sectional shape and the outer wall can have a square cross-sectional shape.

In certain example embodiments, the bottom portion 104 of the coupling 100 includes a coupling feature 134 such as a plurality of mating threads. The coupling feature 134 enables the coupling 100 to securely couple to a base structure. In certain example embodiment, the coupling feature 134 is a snap mechanism, a locking mechanism, a holding mechanism, or any other form of attachment. In certain example embodiments, the bottom portion 104 includes a segment having a gripping feature 136 which aids in handling the coupling 100 when securing the coupling to a base structure. In certain example embodiments, the gripping feature has a plurality of flat surfaces to facilitate turning of the coupling 100. In certain example embodiments, the frangible portion 106 is between the top portion 102 and the bottom portion 104. The frangible portion 106 has a smaller outer diameter than the top portion 102 and the bottom portion 104. In certain example embodiments, the frangible portion 106 has a thickness smaller than that of the adjacent portions of the top portion 102 and the bottom portion 104. In certain example embodiments, the frangible portion 106 is a groove formed between the top portion 102 and the bottom portion 104. In certain example embodiments, the frangible portion 106 is a weak point between the top portion 102 and the bottom portion 104. Thus, when a large enough force is applied to the fixture or coupling above the frangible portion 106, the fixture is configured to break at the frangible portion 106. This provides a predictable and controlled breaking process, preventing the fixture from breaking into many pieces or a more destructive breaking process. In certain example embodiments, the frangible portion 106 is below the top portion 102 and below the base 112. Thus, water which collects in the space 130 bound by the inner cylindrical wall 108, the outer cylindrical wall 110, and the base 112 is isolated from the frangible portion 106, as required by airfield lighting specifications.

Figure 3:
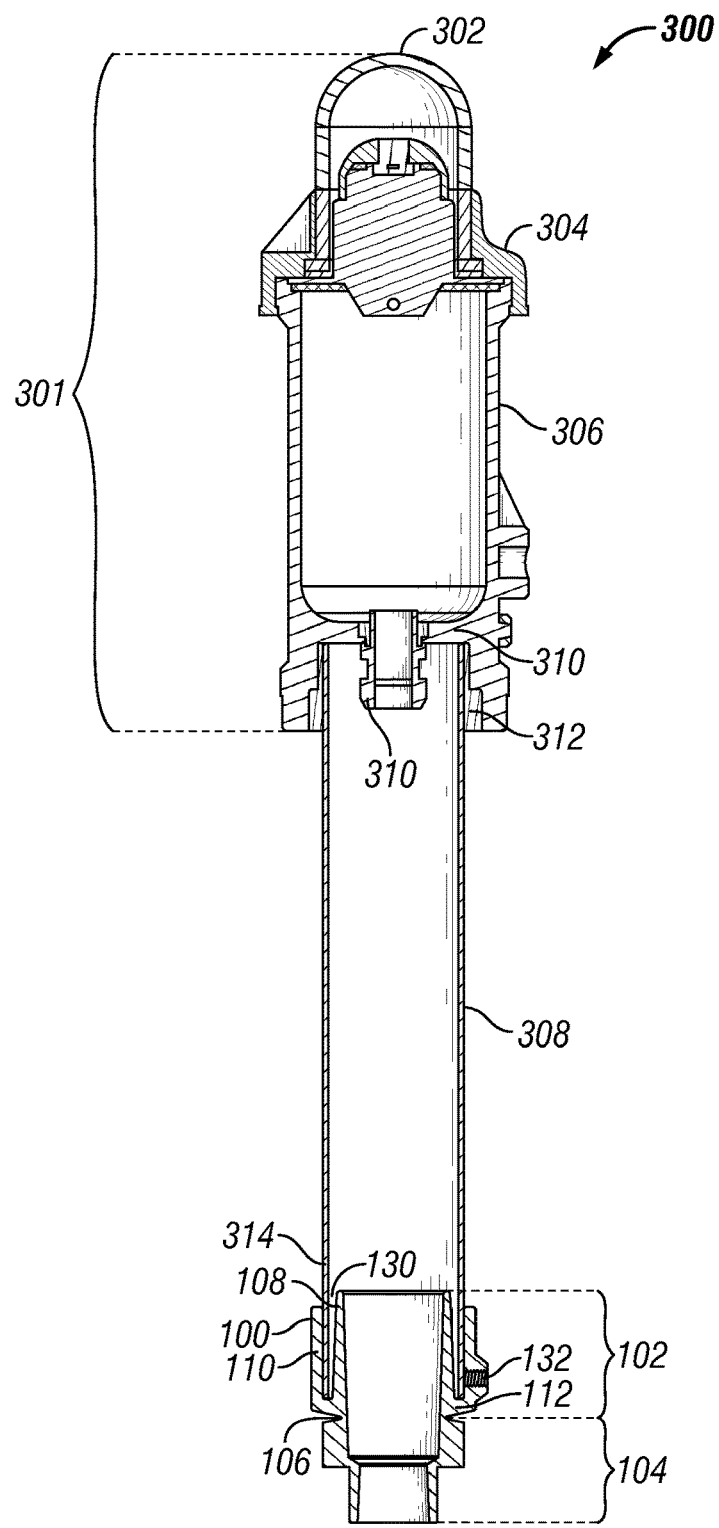
FIG. 3 illustrates a cross-sectional view of a lighting system using the coupling with a fluid penetration barrier, in accordance with example embodiments of the present disclosure.

FIG. 3 illustrates a lighting system 300 using the coupling 100, in accordance with example embodiments of the present disclosure. Referring to FIG. 3, in certain example embodiments, the lighting system 300 includes a light fixture 301, an extension column 308, and the coupling 100. In certain embodiments, the light fixture 301 includes a lighting device 302, a light clamp 304, and a housing 306. The lighting device 302 can be any suitable type of lighting or signage device, including but not limited to a globe light, omni-directional light, spot light, flood light, edge light, approach light, guard light, traffic light, street light, guidance sign, street sign, and a traffic sign. The light device 302 is partially retained by the light clamp 304 which is coupled to the housing 306. The light clamp 304 couples the lighting device to the housing 306. In certain example embodiments, the housing contains certain electronic components and circuitry that drive the lighting device 302. In certain example embodiments, and as illustrated, the housing 306 is tubular shaped. However, the housing can be shaped rectangularly, circularly, or in any other geometric or irregular shape.

In certain example embodiments, the lighting fixture 301 is mounted onto the extension column 308. The extension column adds height to the lighting fixture and can be provided in a variety of length. The extension column is a tubular structure having a top end 312 and a bottom end 314 and an opening traversing its length. The top end 312 of the extension column is coupled to the housing of the lighting device 301. A cord fitting 310 at a base of the housing 306 connects an internal cavity of the housing to the inside of the extension column 308, providing a path for wiring to travel from the lighting device 302 or other electronic components within the housing through to the extension column 308.

In certain example embodiments, the bottom end 314 of the extension column 308 is coupled to the coupling 100. Specifically, in certain example embodiments, the bottom end 314 of the extension column 308 is disposed within the space 130 between the inner cylindrical wall 108 and the outer cylindrical wall 110 of the coupling 100. In certain example embodiments, the bottom end 314 of the extension column 308 abuts the base 112. The bottom end 314 can be secured to the coupling via an attachment mechanism such as a set screw. In certain example embodiments, a set screw can traverse the outer cylindrical wall and tighten against a portion of the bottom end 314 of the extension column 308.

From time to time, water or other fluids may form on the sides of the extension column 308. This may be caused by a variety of environmental conditions, including but not limited to condensation, rain water, melting snow or ice, deicing fluids, plowed snow, ice, slush, and the like. The water formed on the extension column 308, substantial enough to respond to gravity, will run down the sides of the extension column 308 and eventually reach the coupling 100. The water eventually reaches and collects at the base 112 and within the space 130. In certain example embodiments, the space 130 is large enough to accommodate the extension column 308 as well as provide a reservoir for the water. Thus, as more water is collected, the water level in the space 130 rises. When the water level rises above the outer cylindrical wall 110, the water will spill out of the coupling 100 and thus out of the lighting system 300. Since the inner cylindrical wall 108 is at a higher grade than the outer cylindrical wall 110, the water will spill out of the coupling 100 before it reaches the top of the inner cylindrical wall 108, which helps prevent water from pouring into the inside of the inner cylindrical wall 108, and keeps the water away from any internal wiring or electronics, as well as the frangible portion 106.

Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A support coupling, comprising:
   a top portion comprising:
      an inner cylindrical wall;
      an outer cylindrical wall disposed around the inner cylindrical wall, wherein each of the inner cylindrical wall and the outer cylindrical wall comprises a top edge and a bottom edge; and
      a base extending from the bottom edge of the inner cylindrical wall to the bottom edge of the outer cylindrical wall,
         wherein a space is formed between the inner cylindrical wall, the outer cylindrical wall, and the base; and
         wherein the top edge of the inner cylindrical wall extends beyond the top edge of the outer cylindrical wall,
   a bottom portion comprising:
      a gripping segment that has a polygonal outer contour comprising a plurality of flat surfaces, and
      a coupling segment disposed below the gripping segment and having a plurality of mating threads; and
   a frangible portion defined by a substantially V-shaped groove disposed between the base of the top portion and the gripping segment of the bottom portion,
      wherein the frangible portion comprises a structural weak point on the support coupling such that when a force is applied to the support coupling above the frangible portion, the support coupling is configured to break at the frangible portion, and
      wherein an inner opening traverses the top portion and the bottom portion.

2. The support coupling of claim 1, wherein the inner cylindrical wall comprises an inner diameter and an outer diameter, wherein the outer diameter increases from the top edge of the inner cylindrical wall to the bottom edge of the inner cylindrical wall.

3. The support coupling of claim 1, wherein the top portion is configured to receive a portion of a column in the space between the inner cylindrical wall and the outer cylindrical wall.

4. The support coupling of claim 3, wherein fluid running down the column accumulates in the space until a level of the fluid reaches the top edge of the outer cylindrical wall, at which point the fluid spills out over the outer cylindrical wall, wherein the fluid reaches the top edge of the outer cylindrical wall before the fluid reaches the top edge of the inner cylindrical wall.

5. The support coupling of claim 1, wherein at least one screw hole is formed through the outer cylindrical wall.

6. The support coupling of claim 1, wherein the support coupling is integrally formed as a single, continuous component.

7. The support coupling of claim 1:
wherein the inner cylindrical wall comprises an inner diameter that is tapered such that the inner diameter decreases from the top edge of the inner cylindrical wall to the gripping segment of the bottom portion.

8. A coupling, comprising:
an inner cylindrical wall;
an outer cylindrical wall surrounding the inner cylindrical wall,
wherein the outer cylindrical wall comprises a screw hole extending therethrough,
wherein the inner cylindrical wall is coupled to the outer cylindrical wall via a base;
wherein each of the inner cylindrical wall and the outer cylindrical wall comprises an inner diameter and an outer diameter, and wherein the inner diameter of the outer cylindrical wall is larger than the outer diameter of the inner cylindrical wall such that a space exists between the inner cylindrical wall and the outer cylindrical wall; and
wherein the inner cylindrical wall is at a higher grade than the outer cylindrical wall, and
a bottom portion disposed below the base, the bottom portion coupled to the base via a frangible portion defined by a substantially V-shaped groove disposed between the base and a gripping segment of the bottom portion, the frangible portion being a structural weak point on the coupling such that when a force is applied to the coupling above the frangible portion, the coupling is configured to break at the frangible portion, wherein the bottom portion comprises a coupling segment that is integrally formed with and disposed below the gripping segment such that both the gripping segment and the coupling segment of the bottom portion are disposed on one side of the frangible portion while the inner cylindrical wall, the outer cylindrical wall, and the base are disposed on an opposite side of the frangible portion, the coupling segment comprising a plurality of mating threads.

9. The coupling of claim 8, wherein each of the inner cylindrical wall and the outer cylindrical wall has a top edge and a bottom edge, wherein both bottom edges are coupled to the base.

10. The coupling of claim 9, wherein the outer diameter of the inner cylindrical wall increases from the top edge of the inner cylindrical wall to the bottom edge of the inner cylindrical wall.

11. The coupling of claim 8, wherein a channel formed between the inner cylindrical wall, the outer cylindrical wall, and the base collects a fluid until a level of the fluid rises above a top edge of the outer cylindrical wall, wherein the fluid begins to flow over the top edge of the outer cylindrical wall before the fluid level rises to a top edge of the inner cylindrical wall.

12. The coupling of claim 8, further comprising a top portion that comprises a mating feature.

13. A coupling, comprising:
an inner wall;
an outer wall disposed around the inner wall with a clearance therebetween, wherein the inner wall and the outer wall each comprise a top edge and a bottom edge, wherein the bottom edge of the inner wall and the bottom edge of the outer wall are coupled via a base, and wherein the top edge of the inner wall extends beyond the top edge of the outer wall;
a screw hole extending through the outer wall to receive a fastener therethrough;
a bottom coupler extending below the base, the bottom coupler comprising a gripping segment at an upper portion of the bottom coupler and a coupling segment at a lower portion of the bottom coupler, the coupling segment integrally formed with the gripping segment and comprising mating threads configured to mount the coupling onto a receiving structure; and
a frangible portion defined by a substantially V-shaped groove disposed between the gripping segment of the bottom coupler and the base, wherein the frangible portion comprises an outer diameter smaller than that of the bottom coupler and the base, and wherein the frangible portion comprises a structural weak point on the coupling such that when a force is applied to the coupling above the frangible portion, the coupling is configured to break at the frangible portion such that both the gripping segment and the coupling segment of the bottom coupler are disposed on one side of the frangible portion while the inner walk the outer walk and the base are disposed on an opposite side of the frangible portion.

14. The coupling of claim 13, wherein a cross-sectional shape of the outer wall is one of circular, elliptical and polygonal.

15. The coupling of claim 13, wherein a space provided by the clearance and bounded by the inner wall, the outer wall, and the base collects a fluid until a level of the fluid rises above the top edge of the outer wall.

\* \* \* \* \*